(12) United States Patent
Fowler et al.

(10) Patent No.: US 11,400,779 B2
(45) Date of Patent: Aug. 2, 2022

(54) ENDFRAME OF A GANGWAY, GANGWAY, MULTI-CAR VEHICLE AND METHOD OF CONNECTING THE GANGWAY TO A MULTI-CAR VEHICLE

(71) Applicant: Dellner Couplers AB, Falun (SE)

(72) Inventors: Jason Fowler, Allestree (GB); Daniel Alton, Staffordshire (GB)

(*) Notice: Subject to any disclaimer, the term of this patent is extended or adjusted under 35 U.S.C. 154(b) by 150 days.

(21) Appl. No.: 15/931,099

(22) Filed: May 13, 2020

(65) Prior Publication Data

US 2020/0361263 A1 Nov. 19, 2020

(30) Foreign Application Priority Data

May 14, 2019 (EP) .................................... 19174407

(51) Int. Cl.
*B60D 5/00* (2006.01)
*B62D 47/02* (2006.01)

(52) U.S. Cl.
CPC .............. *B60D 5/00* (2013.01); *B60D 5/003* (2013.01); *B62D 47/025* (2013.01)

(58) Field of Classification Search
CPC ......... B60D 5/00; B60D 5/003; B62D 47/025
See application file for complete search history.

(56) References Cited

U.S. PATENT DOCUMENTS

| 5,823,117 | A | 10/1998 | Ommerli |
| 7,743,712 | B2 | 6/2010 | Goebels et al. |
| 8,556,285 | B2 | 10/2013 | Mosaner |
| 10,202,129 | B2 | 2/2019 | Goebels et al. |
| 2010/0025960 | A1* | 2/2010 | Tabellini ................ B60D 5/003 280/403 |
| 2010/0025961 | A1* | 2/2010 | Tabellini ................ B60D 5/003 280/403 |

FOREIGN PATENT DOCUMENTS

| CN | 2 419 125 Y | 2/2001 |
| DE | 102017113578 A1 | 12/2018 |
| EP | 2 002 998 A1 | 12/2008 |
| EP | 2 149 463 A1 | 2/2010 |

(Continued)

*Primary Examiner* — Jacob D Knutson
*Assistant Examiner* — Abigail R Hymel
(74) *Attorney, Agent, or Firm* — Howard IP Law Group, PC

(57) ABSTRACT

An endframe of a gangway, the endframe configured to be connected to an endframe of a different gangway or to a car of a multi-car vehicle, the endframe comprising a beam, a connector attached to the beam, the connector being configured to connect the beam to a beam of an endframe of a different gangway or to connect the beam to a car of a multi-car vehicle or to connect the beam to a connector attached to a beam of an endframe of a different gangway or to connect the beam to a connector attached to a car of a multi-car vehicle, wherein a contact surface formed by a part of the beam and a groove arranged in the beam, wherein the groove has an opening and walls that delimit the groove, wherein one of the walls delimiting the groove is a backward facing wall, wherein the backward facing wall faces away from the contact surface, wherein the connector has a protrusion that is arranged inside the groove.

14 Claims, 14 Drawing Sheets

(56) References Cited

FOREIGN PATENT DOCUMENTS

| | | | |
|---|---|---|---|
| EP | 2 562 014 | A1 | 2/2013 |
| EP | 3 418 084 | A1 | 12/2018 |
| ES | 2483739 | T3 | 6/2014 |
| RU | 1 829 07 | U1 | 9/2018 |
| WO | 1996036519 | A1 | 11/1996 |

\* cited by examiner

ENDFRAME OF A GANGWAY, GANGWAY, MULTI-CAR VEHICLE AND METHOD OF CONNECTING THE GANGWAY TO A MULTI-CAR VEHICLE

FIELD OF INVENTION

The invention relates to an endframe of a gangway, the endframe being suitable to be connected to an endframe of a different gangway or to a car of a multi-car vehicle. The invention also relates to a gangway of a multi-car vehicle, a multi-car vehicle and a method for connecting a gangway to a multi-car vehicle.

BACKGROUND

Gangways are known from everyday life. They provide a means for passengers to move from one enclosure, for example a room of a building or a car of a multi-car vehicle, to a second enclosure, for example a room of a different building or a vehicle or a second car of a multi-car vehicle, by means of such a gangway that is connected to the one enclosure on the one end and the second enclosure at the second end. In multi-car vehicles, like trains or articulated buses, gangways are arranged between a first car and a second car of these types of multi-car vehicles. Gangways are, for example, also used at airports, where they connect the airport building with the plane. Designs are also known, where two gangways are connected to one another. Certain train types have a first car that at one of its ends has a first gangway connected to it. The first end of the first gangway is connected to the first car. These types of trains have a second car with a second gangway attached to it. The first end of the second gangway is attached to the second car. In these types of trains, the second end of the first gangway and the second end of the second gangway are connected to each other, thereby connecting the first gangway to the second gangway in order to provide means for the passengers to safely cross from the first car to the second car.

Regardless of the remaining elements that are used to make up the gangway, e.g. bellows or panels that slide relative to each other in a telescopic fashion, many gangway designs use an endframe as means to connect the gangway to the neighbouring object, which might be a further gangway or a car or a room or a different type of enclosure. Especially with those gangways that are used in technical areas, where the gangway in certain periods of use is detached from its neighbouring object, the use of endframes provides a clear interface to the neighbouring object and provides predefined means for connecting the gangway to the neighbouring object.

With the gangways known from everyday life, problems arise.

Sometimes the endframe itself is not considered aesthetically pleasing. In other designs leakage issues arise.

SUMMARY

Given this background, the problem to be solved by the invention is to suggest an endframe of a gangway that allows for an aesthetical pleasing connection of the gangway to the neighbouring object and/or reduces or completely does away with leakage issues in the connection between the endframe and its neighbouring object.

The invention is based on the general concept to provide a contact surface that is formed by a part of the beam of the endframe. This contact surface can be used as a clearly defined surface for an interface with the neighbouring object, to which the gangway is to be connected. In the understanding that the endframe needs to provide an additional interface, namely an interface, with which the connector interacts, the invention not only provides for the contact surface but also provides for a groove that is arranged in the beam, whereby the groove has an opening and walls that delimit the groove, whereby one of the walls delimiting the groove is a backward facing wall. The backward facing wall faces away from the contact surface. The connector of the endframe has a protrusion that is arranged inside the groove. In providing the groove with the backward facing wall that faces away from the contact surface and in providing the connector with a protrusion that is arranged inside the groove, the endframe according to the invention provides a design that allows the contact surface to be designed free from any limitations that an interface to interact with the connector would bring. In a sense the invention splits the interfaces into two separate objects. By way of the contact surface formed by a part of the beam, the invention provides a first interface for interaction with the neighbouring object, which can be designed with an eye on design features and/or with an eye on the necessity to provide a good sealing. Providing the groove as a second interface that interacts with the connector allows this interface to be specifically designed to the type of connector used.

The invention is directed to an endframe of a gangway. Such an endframe can be of u-shape or c-shape or can have the shape of a ring that surrounds a passage space. The passage space is the window in the frame, through which the passengers can enter into the gangway. The term "ring" is not limited to circular rings or elliptically shaped rings. The term "ring" simply identifies that the frame closes around the passage space. The ring can, for example, also have a rectangular shape. The ring can also have a trapezoidal shape or any polygonal shape. In some designs, the ring can have a top beam and a bottom beam that are straight and have two side beams that connect the respective ends of the top beam and the bottom beam, whereby the side beams can have a curvature. The shape of the endframe beam often is chosen either in dependency of the overall shape of the object, to which it is attached. Hence the endframe often is designed in dependency of the cross-sectional shape of a car of a multi-car train, to which it might be connected. The shape of the endframe can also be chosen in relation to the interface that the neighbouring object, to which the endframe is to be connected, offers.

The endframe of the gangway according to the invention is suitable to be connected to an endframe of a different gangway or to a car of a multi-car vehicle or to a building, if the gangway is used at an airport for example.

The endframe comprises a beam. The endframe can be made up of several beams that are connected to each other. For example, if the endframe is chosen to be u-shaped, the endframe can have a straight top beam with a first end and a second end, whereby a side frame is connected to the first end and a further side frame is connected to the second end of the top beam, the two side beams extending at an angle, preferably at an angle of about or exactly 90° to the top beam. In an embodiment, wherein the endframe is designed to be a ring, the endframe can have a top beam, two side beams and a bottom beam. Additional beams can be provided, for example between one end of a top beam and one end of a side beam, for example by way of a diagonal beam that connects one end of a top beam with the top end of a side beam. A u- or c-shaped endframe or even a ring-shaped endframe can be made up of one singular beam. Using extrusion methods or moulding methods, it is possible to provide such end beams that are made of one singular beam that is moulded or extruded into the desired u-, c- or even ring-shape (whereby when producing a ring-shape it might become necessary to interconnect two free ends of an extruded profile for example by welding or gluing in order to complete the ring).

The endframe has a connector that is attached to the beam. The connector is suitable to connect the beam to a beam of an endframe of a different gangway or is suitable to connect the beam to a car of a multi-car vehicle or to a room or suitable to connect the beam to a connector attached to a beam of an endframe of a different gangway or suitable to connect the beam to a connector attached to a car of a multi-car vehicle or attached to a room. In a preferred embodiment, the connector is releasably attached to the beam. In a preferred embodiment, the connector is suitable to realisably connect the beam to a beam of an endframe of a different gangway or is suitable to realisably connect the beam to a car of a multi-car vehicle or to a room or suitable to realisably connect the beam to a connector attached to a beam of an endframe of a different gangway or suitable to realisably connect the beam to a connector attached to a car of a multi-car vehicle or attached to a room.

In a preferred embodiment, the connector consists of several parts. In a preferred embodiment, one of the parts of the connector is a base plate. The base plate can for example be used to carry a threaded bolt, for example a threaded bolt that is welded or glued to the base plate. The base plate could in a different example contain a threaded hole into which a bolt or a hook can be threaded. The base plate in a different example could also be used to provide a rim that can be gripped by gripping means, for example by a clamp. The base plate could also be used to have a protruding pin arranged on the base plate, for example made as one piece with the base plate, if the base plate is produced by moulding or for example by machining from a block. Likewise, the base plate can have a protruding hook, for example a hook that is welded or glued to the base plate.

According to the invention, the endframe has a contact surface formed by a part of the beam. The contact surface is an outward facing surface of the beam and an outward facing surface of the endframe which by way of being an outward facing surface makes itself suitable to be a contact surface to contact an element of a neighbouring object, to which the gangway is to be connected by way of the endframe.

According to the invention, the endframe has a groove arranged in the beam. The groove has an opening and has walls that delimit the groove. One of the walls delimiting the groove is a backward facing wall, whereby the backward facing wall faces away from the contact surface.

According to the invention, the connector has a protrusion that is arranged inside the groove.

In a preferred embodiment, the endframe can have a contact surface that extends along a u-shape or a c-shape or a ring-shape. In a preferred embodiment, the contact surface has the same shape as the endframe. The advantages of the invention can, however, also be realized, if the contact surface has not the same extent as the endframe. Embodiments are feasible, where the contact surface is u-shaped or c-shaped, while the endframe is ring-shaped. For example, the contact surface can be arranged to extend along a top beam and two side beams that are connected to the top beam and thereby can have a u- or c-shape, while the endframe continues with a bottom beam that does not have a part of the contact surface.

In a preferred embodiment, the contact surface extends along the full length of the beam. Embodiments are also feasible, however, where the contact surface only extends over 50% or more than 50% of the beam. In a preferred embodiment, the extent of the contact surface on the beam in relation to the extent of the beam, on which the contact surface is provided, is in the range of 50% to 100%, preferably in the range of 60% to 100%, preferably in the range of 80% to 100% and more preferably in the range of 90% to 100%. This design rule applies for cases, where the beam of reference is one beam of several beams that make up the endframe, for example if the beam of reference is the top beam of an endframe or if the beam of reference is the side beam or if the beam of reference is a bottom beam. The design rule does, however, also apply for beams that in themselves are u- or c- or ring-shaped. If the endframe is made up of several beams, in a preferred embodiment, a contact surface is provided on at least the majority of beams, most preferably on all beams of which the endframe is made of. In a preferred embodiment, the majority of beams has a contact surface and the contact surface of the individual beam extends along the full length of the respective beam. Embodiments are also feasible, however, where the majority of beams has a contact surface and the contact surface of the individual beam only extends over 50% or more than 50% of the respective beam. In a preferred embodiment, the majority of beams has a contact surface and extent of the individual contact surface on the individual beam in relation to the extent of the individual beam, on which the individual contact surface is provided, is in the range of 50% to 100%, preferably in the range of 60% to 100%, preferably in the range of 80% to 100% and more preferably in the range of 90% to 100%.

In a preferred embodiment, the endframe has a first beam with a contact surface and a second beam with a contact surface, whereby the first beam and the second beam are next to each other and whereby the contact surface of the first beam merges into the contact surface of the second beam.

As identified above, in a preferred embodiment the endframe has a contact surface that extends along a u-shape or a c-shape or a ring-shape. This feature can be realized by designs, where the endframe is made up of one beam (e.g. an extruded or molded beam) of a u-shape or a c-shape or a ring-shape and the contact surface of the beam is designed to follow the design of the one beam that makes up the endframe to provide the contact surface of the endframe. This feature can also be realized by designs, where the endframe is made up of several beam (e.g. beams connected to each other) that together provide the u-shape or c-shape or ring-shape of the endframe and whereby the contact surface of the endframe is provided by the individual contact surfaces of the individual beams merging into one another to make the contact surface of the endframe follow the design the endframe.

In a preferred embodiment, the contact surface that is formed by a part of the beam is arranged in a plane. In a preferred embodiment of an embodiment, where the endframe is made up of several beams and in which the majority and most preferably all of the beams have a contact surface, the majority of these contact surfaces, most preferably all of these contact surfaces, are arranged in one plane. However, stepped designs of the endframe are also feasible. An embodiment is, for example, feasible, whereby the endframe has a top beam and a bottom beam, which both have a contact surface, whereby the contact surfaces of the top beam and the bottom beam are arranged in a first plane and whereby the endframe has two side beams that interconnect the top beam and the bottom beam, whereby both side beams each have a contact surface, whereby the contact surfaces of the side beams are arranged in a second plane, whereby preferably the second plane is parallel to the first plane. Such a stepped design of an endframe allows an interengaging connection of the endframe with the neighbouring object, to which the gangway is to be connected.

In a preferred embodiment, the endframe has a contact surface that is formed by part of a beam of the endframe, whereby this contact surface is arranged in a plane and whereby all remaining parts of the beam and most preferably all remaining parts of the endframe are arranged on one side of this plane. This design rule can be applicable to endframes that have additional beams with additional contact surfaces, whereby the contact surfaces of these additional beams then would be arranged on the same side of the plane, where the remaining parts of the beam and most preferably the remaining parts of the endframe are arranged. More preferred, however, if the endframe has further beams with further contact surfaces, all or at least the majority of contact surfaces are arranged in one plane and all remaining parts of the respective beams and most preferably all remaining parts of the endframe are arranged on one side of this plane. In these designs, the contact surface or the contact surfaces respectively are the most forward facing surface of the respective beam and most preferably of the entire endframe. This provides good means for making the contact surface contact surfaces of the neighbouring object, to which the gangway is to be connected by the endframe.

In a preferred embodiment, the endframe has a connector that has a protruding pin, a protruding bolt or a protruding hook and the contact surface that is formed by part of a beam of the endframe, whereby this contact surface is arranged in a plane and whereby all remaining parts of the connector apart from the protruding pin, the protruding bolt or the protruding hook and all remaining parts of the beam and most preferably all remaining parts of the endframe are arranged on one side of this plane. This design rule can be applicable to endframes that have additional beams with additional contact surfaces, whereby the contact surfaces of these additional beams then would be arranged on the same side of the plane, where the remaining parts of the beam and most preferably the remaining parts of the endframe are arranged. More preferred, however, if the endframe has further beams with further contact surfaces, all or at least the majority of contact surfaces are arranged in one plane and all remaining parts of the respective beams and most preferably all remaining parts of the endframe are arranged on one side of this plane. In these designs, the contact surface or the contact surfaces respectively are the most forward facing surface of the respective beam and most preferably of the entire endframe. This provides good means for making the contact surface contact surfaces of the neighbouring object, to which the gangway is to be connected by the endframe.

In a preferred embodiment, the connector is bolted to the beam. Designs are feasible, where the connector is bolted to the beam in several areas. In a preferred embodiment, the area, in which the connector is bolted to the beam, is an area that is arranged to one end of the connector, while the protrusion of the connector that is arranged inside the groove is arranged at an opposite end of the connector. In a preferred embodiment, the connector has a base plate. In a preferred embodiment, the protrusion that is arranged inside the groove is arranged at one end of the base plate, the protrusion most preferably being the object that forms one edge of the base plate. In a preferred embodiment, the connector that has a base plate, is bolted to the beam by way of bolting the base plate to the beam. In a preferred embodiment, the connector that has a base plate, is bolted to the beam by a bolt or bolts that are arranged at the opposite edge of the base plate in comparison to the arrangement of the protrusion that forms an edge of the base plate.

In a preferred embodiment, the contact surface is arranged in a plane, whereby the contact surface at least partially, preferably entirely, overlaps the backward facing wall, when viewed in a direction perpendicular to the plane, in which the contact surface is arranged. The backward facing wall hence is preferably at least partially, more preferably entirely, arranged behind the contact surface. Such a design allows the connector, for example by way of the protrusion, to impart a force onto the backward facing wall that pushes the contact surface towards the neighbouring object, to which the gangway is to be connected by way of the endframe. In a preferred embodiment, the part of the backward facing wall that overlaps with the contact surface is more than 30%, more preferably more than 40%, more preferably more than 50%, more preferably more than 60%, more preferably more than 70%, more preferably more than 40%, more preferably more than 80%, more preferably more than 90%, more preferably 100% of the total area of the backward facing wall. In a preferred embodiment, the part of the contact surface that overlaps with the backward facing wall is more than 30%, more preferably more than 40%, more preferably more than 50%, more preferably more than 60%, more preferably more than 70%, more preferably more than 40%, more preferably more than 80%, more preferably more than 90%, more preferably 100% of the total area of the contact surface.

In a preferred embodiment, the backward facing wall is arranged in a plane. Embodiments are feasible, whereby the backward facing wall has a concave shape. In such an embodiment, where there is no clearly distinguishable plane wall that makes up the backward facing wall, all parts of a continuous wall that delimit the groove that have a normal vector to the respective part of the surface, which normal vector has a component that is directed perpendicularly to a plane, in which the contact surface is arranged, and which component points away from the contact surface are considered to belong to/make up the backward facing wall. In such an embodiment, where there is no clearly distinguishable plane wall that makes up the backward facing wall, all parts of the walls that delimit the groove that have a normal vector to the respective part of the surface, which normal vector has a component that is directed perpendicularly to a plane, in which the contact surface is arranged, and which component points away from the contact surface are considered to belong to/make up the backward facing wall. In such an embodiment, where there is no clearly distinguishable plane wall that makes up the backward facing wall, all parts of a continuous wall that delimits the groove that have a normal vector to the respective part of the surface, which normal vector has a component that is directed perpendicularly to a plane, in which the contact surface is arranged, and which component points away from the contact surface are considered to belong to/make up the backward facing wall. More preferably in such an embodiment, where there is no clearly distinguishable plane wall that makes up the backward facing wall, all parts of a continuous wall that delimits the groove that have a normal vector to the respective part of the surface, which normal vector lies in a range of +45° to −45° to a plane, in which the contact surface is arranged, and which normal vector points away from the contact surface, are considered to belong to/make up the backward facing wall.

In a preferred embodiment, the contact surface is arranged in a plane and the backward facing wall is arranged in a plane, whereby the angle between the plane, in which the contact surface is arranged, and the plane, in which the backward facing wall is arranged is >0° and <90°, most preferably >10° and <80°, most preferably >20° and <70°.

In a preferred embodiment, the groove extends in parallel to the contact surface. Designs are feasible, where the groove extends along an angle to the contact surface. In a preferred embodiment, this angle would, however, be a slight angle, most preferably being <30°, especially preferred <20°, especially preferred <10°. Designs of the groove are also feasible, where the groove is made in the shape of an arrow with the tip being arranged most preferably in the middle of the longitudinal extent of the contact surface. In a preferred embodiment, especially in a preferred embodiment, where the groove extends in parallel to the contact surface, the groove has a longitudinal extent that is at least 50% of the longitudinal extent of the contact surface, more preferably at least 60%, more preferably at least 70%, more preferably at least 80%, more preferably at least 90%, more preferably 100% of the longitudinal extent of the contact surface. Designs are feasible, where the groove is longer than the contact surface. Such designs can for example be those where the beam that has the groove and the contact surface does not have an end face that is perpendicular to the longitudinal axis of the beam, but has and end face that is orientated at an angle to the longitudinal axis. If the groove and the contact surface are arranged at different distances to the longitudinal axis, such designs with angled end face may lead to the groove being longer than the contact surface. Designs with beams with angled end face might be used to improve the attachment between the one beam and the neighbouring beam, to which the beam is attached. If both beams each have angled end faces, the attachment of the end faces to one another may be improved.

In a preferred embodiment, a surface of the protrusion of the connector contacts the backward facing wall.

In a preferred embodiment, the protrusion of the connector that is arranged inside the groove has an intermediate part that extends parallel to the contact surface or at least in a small angle of less than 30°, most preferably less than 20°, most preferably less than 10° to the contact surface and has an end part that projects at an angle to the intermediate part. In a preferred embodiment, the end part projects at an enclosed angle of less than 80°, more preferably of less than 70°, more preferably of less than 60° and more preferably of less than 50° to the intermediate part. The end part of the connector most preferably projects at an angle in a direction towards the contact surface. The intermediate part hence would be arranged further away from the contact surface than the end of the end part that projects at an angle from the intermediate part. The end part can have the shape of a flange or a rim. In a preferred embodiment, the end part has an engagement surface that most preferably has the same shape as at least a part of the backward facing wall. Hence, if the backward facing wall is arranged to be in a plane, the engagement surface of the end part of the protrusion most preferably also is arranged to lie in a plane. If the backward facing wall is arranged to be of a concave shape, most preferably, the engagement surface of the end part of the protrusion of the connector has a convex shape that corresponds to the concave shape of the backward facing wall. In a preferred embodiment, the engagement surface of the end part of the protrusion of the connector contacts the backward facing wall.

In a preferred embodiment, the beam is a longitudinal beam. In a preferred embodiment, the extent of the beam in a first direction of a three-dimensional system of coordinates, especially preferred a cartesian system of coordinates, is substantially larger than the extent of the beam in the second direction and is substantially larger than the extent of the beam in the third direction. In a preferred embodiment, the cross-section of the beam in a section perpendicular to the direction of its longest extent is generally rectangular or generally quadratic, but could also be generally circular or generally of elliptical shape.

In a preferred embodiment, the cross-sectional shape of the beam in the cross-sections perpendicular to its direction of longest extent stay the same for the majority of the extent of the beam. Most preferably, 60%, most preferably 70%, most preferably 80%, most preferably 90% of the extent of the beam in the direction of its longest extent has the same cross-section. The cross-section might vary towards the respective end of the beam to facilitate the connection of the respective beam to a neighbouring beam. In an especially preferred embodiment, the beam has the same cross-sectional shape along its full extent in its direction of longest extent. This might, for example, be the case, if the beam is an extruded beam.

In a preferred embodiment, where the endframe has several beams that are connected to each other, for example screwed together at flanges or welded together or glued together, the individual beams at least for the majority of their extent into their respective direction of longest extent have the same cross-sectional shape.

In a preferred embodiment, where the endframe is made up of several beams, the majority of the beams, more preferably all beams have the same cross-sectional design or for those embodiments, where the individual beams only have a constant cross-sectional design for a certain percentage of their individual longitudinal extend, that shape of the cross section, that for a certain percentage of the individual longitudinal extend of the individual beam is constant, is the same shape for the majority of beams, preferably all beams that only have a constant cross-sectional design for a certain percentage of their individual longitudinal extend.

In a preferred embodiment, the beam is a profiled beam. In a preferred embodiment, the profiled beam has a section that in cross-section is c- or u-shaped, whereby the opening of the groove opens towards the interior of the section that in cross-section is c- or u-shaped. In a preferred embodiment, the base plate closes a part of the opening that remains due to the c- or u-shape of that section of the beam. Hence, in the area, where a connector with a base plate is arranged, the base plate can be used to close the c- or u-shaped section of the beam in that area.

In a preferred embodiment of the embodiment, where the endframe is made up of several beams, the majority of beams, more preferably all beams are cut off sections from a profiled beam that was cut into sections to provide the majority, preferably all individual beams that make up the endframe.

In a preferred embodiment of the embodiment, where the endframe is made up of several beams, the majority of beams, more preferably all beams have a connector attached to it. Most preferably the majority, more preferably all connectors attached to beams of the endframe are of the same basic design, namely have a protrusion that is arranged inside a groove of the respective beam and most preferably are of the same basic design in the sense that the respective connectors have a base plate, most preferably a base plate of the design described above for the individual beam.

In a preferred embodiment, a sealing is attached to the beam. In a preferred embodiment, the beam has a sealing groove, whereby a part of the sealing is introduced into the sealing groove and held by the sealing groove. In a preferred embodiment, the sealing also generally extends in the direction of longest extent of the beam. In a preferred embodiment, the extent of the seal in the direction of longest extent of the beam is at least 50%, most preferably 60%, more preferably 70%, more preferably 80%, more preferably 90%, more preferably 100% of the length of the beam in its direction of longest extent.

In a preferred embodiment, the endframe has a seal that is a ring-shaped, while also c-shaped or u-shaped seals are feasible. The seal can be made up of individual seals of individual beams, which individual seals are connected to each other. More preferably, the seal is made up of one piece, whereby for embodiments where the endframe is made up of several beams and the several beams have a sealing groove each, the respective section of the seal that runs along the respective beam can be placed partially in the sealing groove of the respective beam.

In a preferred embodiment, the beam has a reinforcing core structure. This reinforcing core structure can be provided by a part of the beam being generally of a pipe-shape, the pipe extending in the direction of longest extent of the beam. The part that makes up the reinforcing core structure of the beam in cross-sections perpendicular to the direction of longest extent of the beam has a closed cross-section in the sense of a ring-shaped cross-section. The shape of the ring must not necessarily be circular or elliptical, but can be a quadratic or a rectangular ring or a polygon. In a preferred embodiment, the endframe has a reinforcing core structure. In the embodiment, where the endframe is made up of several beams, this reinforcing core structure can be provided by the reinforcing core structures of the individual beams.

In a preferred embodiment, where the connector is designed to have a base plate, the base plate can be designed to have a base plate contact surface. The base plate can even have a first base plate contact surface and a second base plate contact surface. The base plate contact surface can be provided by an elevation, especially by a ledge arranged on the base plate. The base plate contact surface can preferably be arranged in the same plane, in which the contact surface is arranged, if the contact surface is arranged in a plane. In a preferred embodiment, the base plate contact surface extends parallel to the contact surface of the beam. In a preferred embodiment, the base plate contact surface extends across the complete width of the base plate of the connector. In a preferred embodiment, a protruding pin, a protruding bolt or a protruding hook arranged on the base plate of the connector is arranged to protrude from the base plate contact surface. The ledge that provides the base plate contact surface can have a threaded hole, into which a bolt can be screwed. In a preferred embodiment, the base plate contact surface has a generally rectangular shape. If a first base plate contact surface and a second base plate contact surface are provided, that they are most preferably arranged in parallel to each other and most preferably are arranged in the same plane.

In a preferred embodiment, the base plate of the connector is of generally rectangular shape. In a preferred embodiment, the extent of the base plate in the direction of longest extent of the beam is substantially smaller than the extent of the beam in its direction of longest extent. In a preferred embodiment, the extent of the base plate in the direction of the longest extent of the beam is less than 30%, most preferably less than 25%, most preferably less than 20%, most preferably less than 15%, most preferably less than 10% of the extent of the beam in the direction of its longest extent. In a preferred embodiment, the base plate is arranged such that its thickness direction is perpendicular to the contact surface of the beam, while its length-direction and its width-direction are arranged in a plane parallel or identical to the plane, in which the contact surface is arranged.

In a preferred embodiment, more than one connector can be attached to the beam. In a preferred embodiment, more than two, preferably more than three connectors are attached to the beam. In a preferred embodiment, the majority of the connectors, most preferably all of the connectors connected to the beam have a base plate. In a preferred embodiment, most of the connectors, most preferably all of the connectors connected to the beam have the same base plate design. In a preferred embodiment, at least two of the connectors connected to the beam are of different design. While the two connectors might have the same base plate design, additional parts attached to the base plate, like protruding pins, protruding bolts or protruding hooks might differ from connector to connector.

In a preferred embodiment, the connector can slide along the groove. In a preferred embodiment, the protrusion of the connector that is arranged inside the groove holds the connector in the groove and prevents the connector from being pulled out of the groove, while the arrangement of the protrusion inside the groove has sufficient play in order to allow the connector to be slid along the groove. If the groove is arranged to point in the direction of longest extent of the beam, the connector can be slid in the direction of the longest extent of the beam. Sliding the connector along the groove allows an easy placement of the connector at the point where it is to be attached to the beam.

In a preferred embodiment, the beam might have a top groove and the connector, most preferably the base plate of the connector, might have a projection that projects into the top groove of the beam. In such an arrangement, the connector, most preferably the base plate of the connector, would be arranged with its protrusion inside the groove and its projection inside the top groove of the beam. Most preferably, the protrusion is arranged at one end of the base plate and the projection is arranged at the opposite end of the base plate, such that a connector can be held at two ends and thereby be stably connected to the beam. In a preferred embodiment, the projection and the protrusion are arranged at an angle to each other. In a preferred embodiment, the projection projections into a direction from the base plate, which direction is within the range of 45° to 135°, more preferably in the range of 70° to 110° to the direction in which the protrusion, more preferably the intermediate part of the protrusion, if the protrusion has an intermediate part, extends.

Holes might be arranged at the bottom of the top groove. Bolts that attach the connector, most preferably the base plate of the connector to the beam, might be arranged to pass through holes in the projection of the connector and might be arranged to either be screwed into threaded holes at the ground of the top groove or might be arranged to pass through unthreaded holes in the ground of the top groove and might be fixed to bolts arranged on the other side of the wall that makes up the ground of the top groove. Other arrangements might be thought of, where the projection is wedged into the top groove or where the projection has movable wedges that can be moved for example by way of a screw from a loosened position into a wedging position, whereby the wedges would then clamp the projection into the top groove.

In a preferred embodiment, the contact surface formed by a part of the beam is an elongated contact surface. In a preferred embodiment, the extent of the contact surface in a first direction of a two-dimensional system of coordinates, especially preferred a two dimensional cartesian system of coordinates, is substantially larger than the extent of the beam in the second direction. In a preferred embodiment, the contact surface is generally of rectangular shape.

In a preferred embodiment, the groove arranged in the beam has an undercut. In a preferred embodiment, the backward facing wall is part of the undercut of the groove.

Wherever in this description a c-shape or a u-shape are being mentioned, the c-shape is used to highlight that the cross-sectional area can be generally curved, while u-shape is used to indicate that at least the sides of the cross-sectional shape can be straight lines, whereby a u-shape would also include cross-sectional designs with two straight sides that are connected to the respective ends of a straight bottom, the angle between the sides in the bottom most preferably being 90°.

The gangway of a multi-car vehicle according to the invention has an endframe according to the information.

In a preferred embodiment, the gangway has at least one bellows. The gangway might have an outwardly facing bellows. An outwardly facing bellows is understood to be a bellows, whereby the individual convolutes of the bellows open towards the inside of the gangway while the rounded or v-shaped bottoms of the individual convolutes are arranged further outward. The gangway might have an inwardly facing bellows. An inwardly facing bellows is understood to be a bellows, whereby the individual convolutes of the bellows open towards the outside of the gangway while the rounded or v-shaped bottoms of the individual convolutes are arranged further inward. The gangway might even have outwardly facing bellows and inwardly facing bellows. The inwardly facing bellows might be arranged to the inside of the outwardly facing bellows such that the bottoms of the individual convolutes of the inwardly facing bellows form the elements that delimit the passage space, while the bottoms of the individual convolutes of the outwardly facing bellows form part of the outside perimeter of the gangway. The inwardly facing bellows might also be arranged to the outside of the outwardly facing bellows such that the bottoms of the individual convolutes of the outwardly facing bellows and the bottoms of the individual convolutes of the inwardly facing bellows face each other in a middle section of the gangway, while the individual convolutes of the inwardly facing bellows open towards the outside of the gangway and the individual convolutes of the inwardly facing bellows open towards the inside of the gangway. The gangway might also have two inwardly facing bellows, the one being arranged inside the other. The gangway might have two outwardly facing bellows, the one being arranged inside the other. The gangway might have no bellows or might have in addition to bellows sliding walls that slide relative to each other in a telescopic manner. One end of the bellows might be attached to the endframe. The attachment of the end of the bellows to the endframe can be made by bolts, stitching, clamping or possibly even a Velcro arrangement or even gluing or welding.

A design is feasible, where the endframe is the last piece of the gangways and that a circumferential outer surface of the endframe is visible. In such an arrangement, the bellows would be attached to one side of the endframe, while the contact surface of the endframe is arranged on an opposite side, that faces towards the neighbouring object to which the gangway is to be connected by means of the endframe. Other designs are, however, also feasible, where the outer circumferential surface of the endframe is hidden behind other elements of the gangway. These other elements might be parts of the bellows, for example a lip of the bellows that is protruding over the outer circumferential surface of the endframe. It might also be feasible to have other design elements cover the outer circumferential surface of the endframe.

The gangway might have support structures, like for example support beams that support frames or hoops of the bellows or that might support tread plates of the gangway. Such support structures might be connected to the endframe.

In a preferred embodiment, a gangway according to the invention essentially is made up of two gangways. In this embodiment, the gangway has a first part (a first gangway) that has a first bellows and has an endframe according to the invention. This large gangway would have a second part (a second gangway) that has a second bellows, whereby this second part also has an endframe according to the invention. According to the invention, the endframe of the first part is attached to the endframe of the second part. Hence, the specific design of the endframe of the invention is used to facilitate the connection between a first gangway and a second gangway, that together make up a large gangway. Such designs are feasible for example in trains, whereby the first part of the large gangway (the first gangway) is attached to one car of a multi-car vehicle, while the second part (the second gangway) is attached to the second car of a multi-car vehicle. If the first car and the second car are joined, the first part (the first gangway) and the second part (the second gangway) can be joined to make up one large gangway between the first car and the second car. The advantages of the endframe according to the invention can already be obtained at this point of connection between the first part and the second part.

In a preferred embodiment, the gangway has an endframe according to the invention at both ends of the gangway. This is advantageous in designs, where one single gangway is arranged between two cars of a multi-car vehicle. In such a design, the respective endframe at the respective end of the gangway could be connected to the neighbouring object, namely to the neighbouring car. This design of a gangway with an endframe according to the invention at each end of the gangway is however also advantageous in designs, where a large gangway is made up of at least two gangways attached to each other. In such designs, each gangway that makes up the large gangway has an endframe at each of its ends. Hence, the advantages provided by the endframe of the invention are used when connecting the first gangway to the second gangway, but also when connecting the first gangway to the first car and the second gangway to the second car.

The multi-car vehicle according to the invention has a gangway according to the invention. The multi-car vehicle might have one (single) gangway. In such a design, the gangway would be connected to one car of the multi-car vehicle at one end and would be connected to a second car of the multi-car vehicle at its other end. Most preferably, such a gangway has an endframe according to the invention at each of its ends, hence allowing the advantages of the endframe according to the invention to be realized at each connection to the respective car. A multi-car vehicle might also have a large gangway, which is made up of at least two gangways according to the invention as described above.

In a preferred embodiment, the multi-car vehicle according to the invention has a car, whereby the car has a frame, whereby the endframe of the gangway according to the invention is attached to the frame of the car.

In a preferred embodiment, the frame of the car is of the same design as the endframe of the gangway.

In a preferred embodiment, the frame of the car has a beam and a contact surface formed by a part of the beam. In a preferred embodiment, the endframe of the gangway is attached to the frame of the car in such a manner that the contact surface of the endframe of the gangway contacts the contact surface of the frame of the car. In a preferred embodiment, the contact surface of the endframe is ring-shaped and the contact surface of the frame is ring-shaped. In a preferred embodiment of a ring-shaped contact surface of the endframe and a ring-shaped contact surface of the frame, the contact surface of the endframe contacts the contact surface of the frame at all points of the ring. Hence, the contact of the contact surface of the endframe to the contact surface of the frame can be used to close off a passage space or the interface between the endframe and the car preventing anything from the outside entering into the passage space through this interface. Even if the contact between the contact surface of the endframe and the contact surface of the frame is not of such a type that it provides a perfect seal, the circumstance that the contact surface of the endframe rests against the contact surface of the frame along its ring-shape provides an aesthetically pleasing design. When looked upon from the outside or when looked upon from the inside (depending on where the contact surface is arranged on the beam), this contact between the contact surface of the endframe and the contact surface of the frame can provide a design that looks clean and uninterrupted.

In a preferred embodiment, a seal is arranged between the endframe of the gangway and the car of the multi-car vehicle. In a preferred embodiment, the seal is arranged between the endframe of the gangway and a frame of the car.

In a preferred embodiment, the endframe has a connector that has a protruding pin, whereby the protruding pin engages into a hole in the frame of the car, preferably into the hole arranged on a connector, preferably a hole arranged in a base plate of a connector attached to a frame of the car. In a preferred embodiment, the frame of the car has a connector that has a protruding pin, whereby the protruding pin engages into a hole in the endframe of the gangway, preferably into the hole arranged on a connector, preferably a hole arranged in a base plate of a connector attached to a endframe of the gangway.

In a preferred embodiment, the endframe has a connector that has a protruding bolt, whereby the protruding bolt engages into a hole in the frame of the car, preferably into the hole arranged on a connector, preferably a hole arranged in a base plate of a connector attached to a frame of the car. Preferably the hole is a threaded hole. Preferably the bolt is a threaded bolt. Preferably the bolt passes through an unthreaded hole and a nut is attached to the bolt on the other side of the hole, which nut rests against the wall that surround the hole. In a preferred embodiment, the frame of the car has a connector that has a protruding bolt, whereby the protruding bolt engages into a hole in the endframe of the gangway, preferably into the hole arranged on a connector, preferably a hole arranged in a base plate of a connector attached to a endframe of the gangway. Preferably the hole is a threaded hole. Preferably the bolt is a threaded bolt. Preferably the bolt passes through an unthreaded hole and a nut is attached to the bolt on the other side of the hole, which nut rests against the wall that surround the hole.

In a preferred embodiment, the endframe has a connector that has a protruding hook, whereby the protruding hook engages into a hole in the frame of the car, preferably into the hole arranged on a connector, preferably a hole arranged in a base plate of a connector attached to a frame of the car. Preferably the hole passes through the hole and holds against the wall that surround the hole from the other side. In a preferred embodiment, the frame of the car has a connector that has a protruding hook, whereby the protruding hook engages into a hole in the endframe of the gangway, preferably into the hole arranged on a connector, preferably a hole arranged in a base plate of a connector attached to a endframe of the gangway. Preferably the hole passes through the hole and holds against the wall that surround the hole from the other side.

The method according to the invention provides the connection of the gangway according to the invention to a car of a multi-car vehicle, whereby the frame of the car has a contact surface, whereby the endframe is connected to the frame and whereby in connecting the endframe to the frame, the contact surface of the endframe is pressed against the contact surface of the frame or a seal is arranged between the contact surface of the endframe and the contact surface of the frame.

The method according to the invention for connecting the first part of the gangway of a large gangway described above to the second part of the large gangway provides for the endframe of the first part to be connected to the endframe of the second part, whereby in connecting the endframe of the first part to the endframe of the second part, the contact surface of the endframe of the first part is pressed against the contact surface of the endframe of the second part or a seal is arranged between the contact surface of the endframe of the first part and the contact surface of the endframe of the second part.

The multi-car vehicle according to the invention can be a train or can be a tram or can be an articulated bus. The gangway according to the invention can be used in such multi-car vehicles. The gangway according to the invention can, however, also be used to bridge the gap between a building and a vehicle, whereby the vehicle most preferably is a plane.

BRIEF DESCRIPTION OF THE DRAWINGS

Below, the invention will be explained in more detail with reference to drawings that only show exemplary embodiments of the invention. The drawings show.

DETAILED DESCRIPTION

Figure 1:
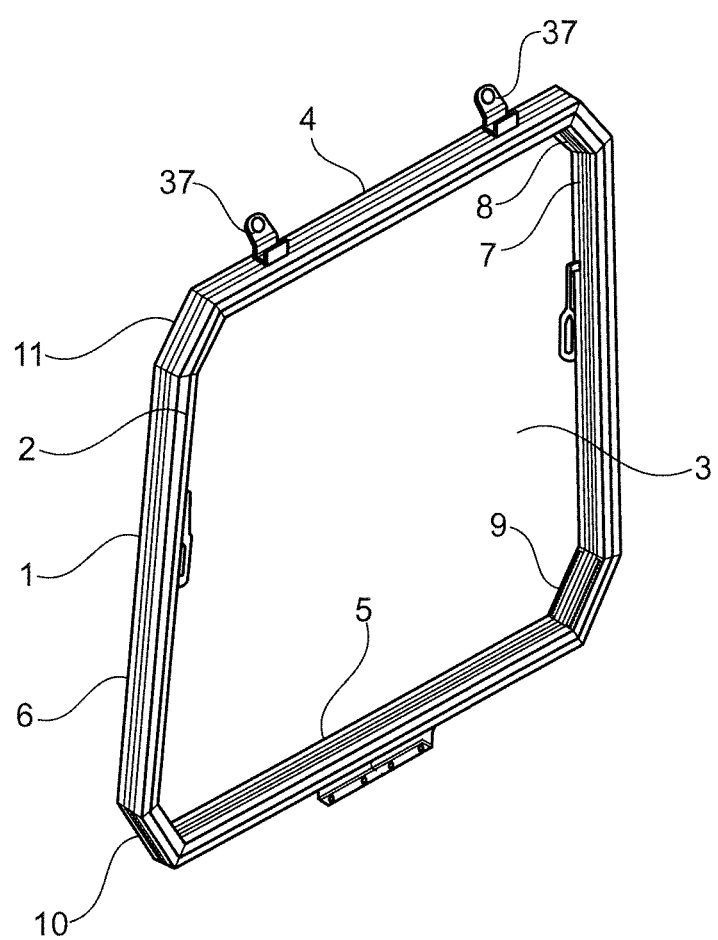
FIG. 1 is a perspective view onto two endframes according to the invention being connected to each other.

FIG. 1 shows two endframes 1, 2 of gangways in an interconnected state. Endframe 1 would belong to a first gangway and endframe 2 would belong to a second gangway. The first gangway is connected to the second gangway by means of endframe 1 being connected to endframe 2. Further parts of the gangways have not been shown in FIG. 1 to facilitate the view onto the endframes according to the invention. Endframe 1 and endframe 2 are of same design, but arranged in mirrored shape, the plane of symmetry being the vertical plane between the two endframes 1, 2. To facilitate the description, the description below will be focused on describing endframe 1. Endframe 1 and 2 being of same, but mirrored design, the description of endframe 1 of course also reads onto the design of endframe 2.

As can be seen from FIG. 1, endframe 1 has the shape of a ring that surrounds a passage space 3. The passage space 3 is the space, through which the passengers can pass.

The ring-shape of the endframe 1 is obtained by eight beams that make up the endframe 1 being connected to each other. The beams are a top beam 4 and a bottom beam 5. Furthermore, side beams 6, 7 are provided. Corner beams 8, 9, 10, 11 are arranged to connect the side beams 6, 7 to the top beam 4 or to connect the side beams 6, 7 to the bottom beam 5 respectively. As can be seen from FIG. 1, the endframe 1 has the shape of a polygonal ring. Top beam 4 and bottom beam 5 are arranged in parallel to each other. Side beam 6 and side beam 7 are arranged at a slight angle to each other. Looking at FIG. 1 it becomes readily apparent that the specific design of the endframe can easily be changed by changing the shape, design or presence of the beams. The endframe can be adapted to the specific surroundings, in which it will be used, especially the type of multi-car vehicle, it is used with. The endframe 1 could be adapted to be a u-shaped endframe, if for example the bottom beam 5 was removed or even if the bottom beam 5 and the corner beams 9, 10 would be removed.

As can be seen from FIG. 1, top beam 4, bottom beam 5, side beams 6, 7 and corner beams 8, 9, 10, 11 are longitudinal beams. The extent of the beams 4, 5, 6, 7, 8, 9 10 11 in a first direction of a three-dimensional cartesian system of coordinates is substantially larger than the extent of the beam in the second direction and is substantially larger than the extent of the beam in the third direction.

The gangway can have lifting hooks 37 arranged on the beam 4 for lifting the gangway. Below the beam 5 a section can be provided that gives the gangway enough clearness from the frame to the bellows so that the gangway can rest on the coupler. The beams 6 and 7 have handles of attaching mechanism that is used to lock and unlock the gangways together.

The beams 4, 5, 6, 7, 8, 9 10 11 are welded together, but could also be glued together or bonded together.

As also becomes readily apparent when looking at FIG. 1, the geometric shape of the endframe 1 could be changed into a circular ring or an elliptical ring or a c-shape, for example by extruding one single beam into the appropriate ring/elliptical or c-shape. In such a design, the endframe 1 would be made up of one single beam.

As can be seen from FIG. 1, the endframe 1 rests nicely against the endframe 2. When looking from the passage space 3 onto the inward facing side surfaces of the endframe 1 and endframe 2, it becomes apparent, that these inside facing side surfaces of the endframe 1 and endframe 2 rest directly against each other without gaps at the interface. This provides an aesthetically pleasing design. No design elements would need to be provided that cover the interface between the endframe 1 and the endframe 2 from the inside. The inward facing side surfaces of the endframe 1 and the endframe 2 in the way they smoothly rest against each other provide a structure, which can be presented to the passenger in the passage space 3. Additionally, security aspects are covered, as there are no gaps, where a passenger could grab in between the endframe 1 or endframe 2. Furthermore, no gaps are provided between the endframe 1 and endframe 2 through which objects could enter into the passage space 3.

Figure 6:
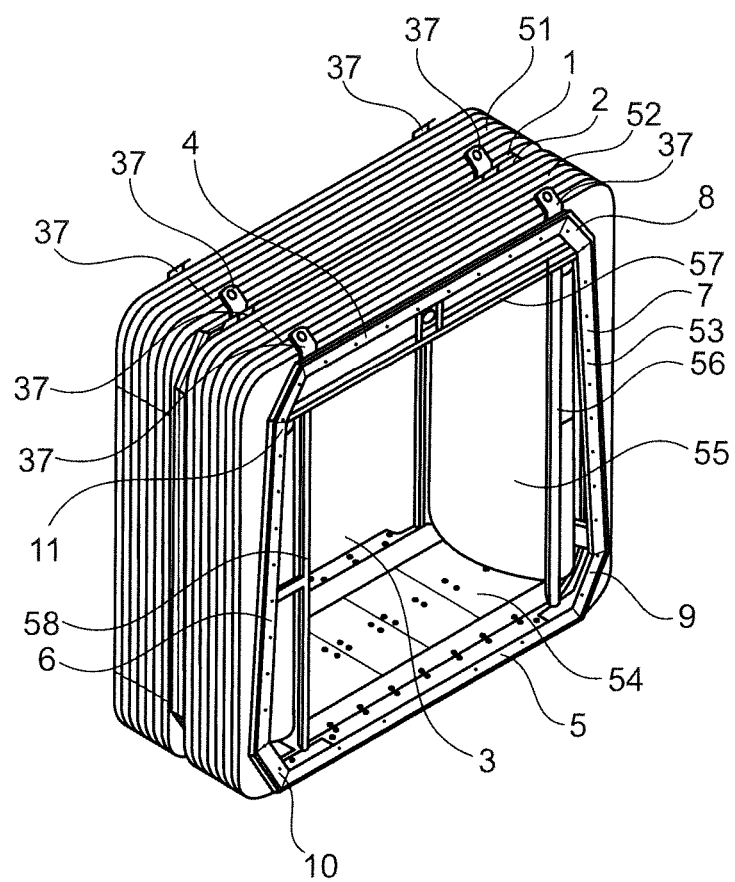
FIG. 6 is a perspective view onto two gangways according to the invention, the endframe of the one gangway being connected to the endframe of the other.

FIG. 6 shows a first gangway 51 connected to a second gangway 52. The one endframe 1 of the first gangway 51 is connected to the one endframe 2 of the second gangway 52. The other endframe (not shown) of the first gangway 51 that is arranged at the opposite end of the first gangway 51 compared to the one endframe 1 can be connected to a car of a multi-car vehicle (not shown). The other endframe 53 of the second gangway 52 that is arranged at the opposite end of the second gangway 52 compared to the one endframe 2 can be connected to a car of a multi-car vehicle (not shown). The endframe 53 is of the same design as the endframe 1.

FIG. 6 shows that the gangway 1,2 can have interior elements in the passage space 3. A floor 54 and a side panel 55 can be arranged inside the passage space 3. Interior beams 56, 57, 58 can be arranged inside the passage space 3 and attached to their neighbouring endframe 53. The interior beams 56, 57, 58 can carry interior elements, like for example a part of the side panel 55. Both the first gangway 51 and the second gangway 52 have an outwardly facing bellows 59, which is understood to be a bellows, whereby the individual convolutes of the bellows open towards the inside of the gangway 51, 52 while the rounded bottoms of the individual convolutes are arranged further outward.

Figure 7:
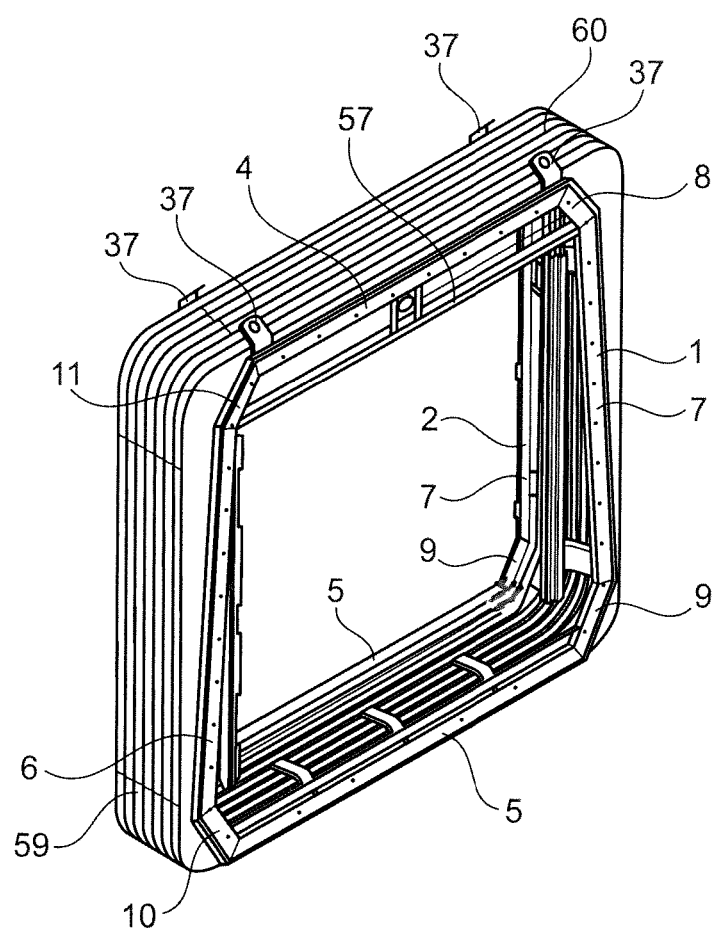
FIG. 7 is a perspective view onto a gangway according to the invention.

FIG. 7 shows a gangway 60 according to the invention. The gangway 60 has one endframe 1 at one of its ends and a further endframe 2 at its opposite end. The gangway 60 has an outwardly facing bellows 59. Either endframe 1, 2 can be used to connect the gangway 60 to a car of a multi-car vehicle (not shown) or to a further gangway (not shown). In FIG. 7 the beams 5,7,9 of the endframe 2 have been identified with the reference signs 5,7,9, which are also used to identify the beams of the endframe 1 in order to highlight the design-symmetry among the endframe 1 and endframe 2.

Figure 2:
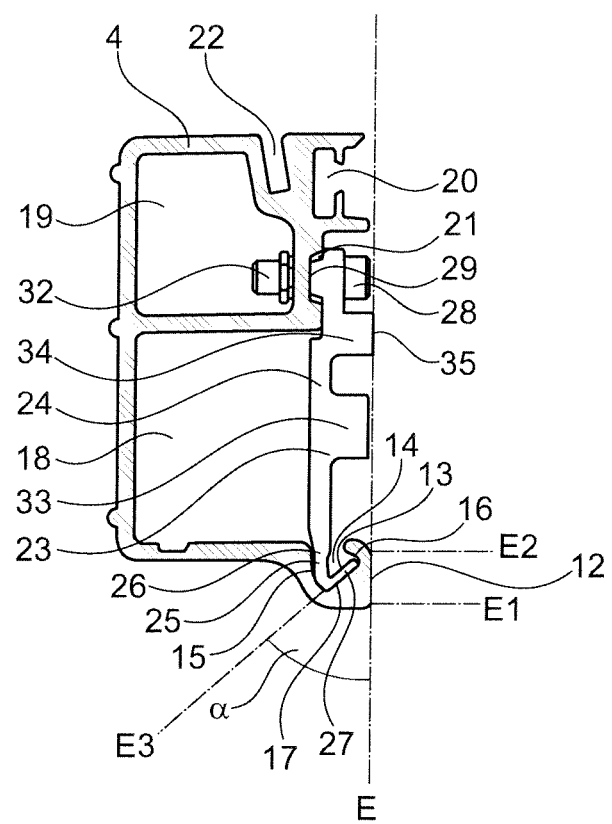
FIG. 2 is a cross-sectional view of a beam of an endframe according to the invention with a connector attached to the beam.

FIG. 2 shows the cross-section of a beam of the endframe. For ease of reference, we use the FIGS. 2, 3, 4, 5 to describe the design with reference to the top beam 4. In a preferred embodiment, the cross-sectional shape of all beams of the endframe is the same, however. Hence, the description of the geometric design of the top beam 4 as provided with reference to the FIGS. 2, 3, 4, 5 can also be applied to the bottom beam 5, the side beams 6, 7 or the corner beams 8, 9, 10, 11. In a specific embodiment, it might be, however, that only the top beam 4, the bottom beam 5 and the side beams 6, 7 are provided with connectors, while the corner beams 8, 9, 10, 11 are arranged without connectors.

Figure 3:
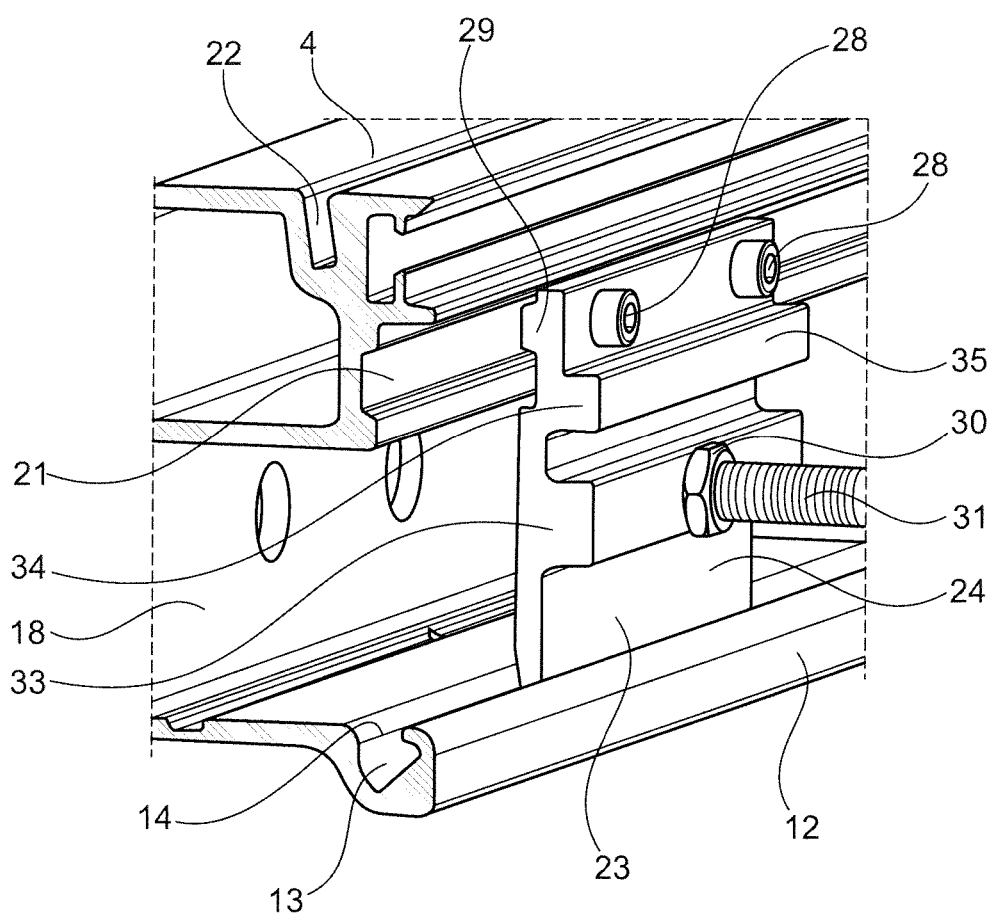
FIG. 3 is a perspective view onto a section of the beam with a connector being attached to the beam.

The section shown in FIG. 2 is a section in a plane perpendicular to the direction of longest extent of the top beam 4. FIGS. 2, 3 show that the top beam 4 has a contact surface 12 formed by a part of the beam. The contact surface 12 is arranged in a plane E. The contact surface 12 is of generally rectangular shape. The contact surface 12 is an elongated object. The contact surface 12 has its largest extent in the direction of the largest extent of the top beam 4. As can be seen from FIG. 3, the contact surface 12 extends in parallel to the direction of longest extent of the top beam 4. The contact surface 12 essentially has the same extent into the direction of the longest extent of the top beam 4 as the top beam 4 has. As can be seen from FIG. 2 all further elements (apart from a bit of the nut 30 and the bolt 31) are arranged on the same side of the plane E. Especially, all remaining parts of the beam 4 are arranged on one side of the plane E. The contact surface 12 hence is the most forward arranged surface of the top beam 4.

The top beam 4 has a groove 13 arranged in the beam. The groove 13 has an opening 14. Furthermore, the groove has walls 15, 16 and a backward facing wall 17 that together delimit the groove 13. The backward facing wall 17 faces away from the contact surface 12. The contact surface 12 is facing forward (towards the right), while the backward facing wall faces backwards (the normal vector to the backward facing wall 17 has a component that is pointing backwards (towards the left)). In FIG. 2, a first horizontal plane E1 and a second horizontal plane E2 have been sketched. The first plane E1 indicates the horizontal plane, where the contact surface 12 ends. The second plane E2 indicates the horizontal plane at the point, where the vertically extending contact surface 12 ends on the other side. Introducing the first plane E1 and the second plane E2 into FIG. 2 helps to understand, that the contact surface 12 is arranged in a plane E and that the contact surface 12 entirely overlaps the backward facing wall 17, when viewed in a direction perpendicular to the plane E, in which the contact surface is arranged. As can be seen from FIG. 2, the backward facing wall lies entirely between the first plane E1 and the second plane E2. In FIG. 2, a further plane E3 has been indicated. The backward facing wall 17 is arranged in this plane E3. As can be seen from FIG. 2, the contact surface 12 is arranged in a plane E and the backward facing wall is arranged in a plane E3, whereby the angle ALPHA between the plane E, in which the contact surface 12 is arranged, and the plane E3, in which the backward facing wall is arranged, is >0° and <90°, namely approximately 50° in the embodiment shown in FIG. 2.

As can best be seen from FIG. 3, the groove 13 extends in parallel to the contact surface 12.

As can be seen from FIGS. 2, 3, the top beam 4 is a profiled beam. The top beam 4 has a section 18, that in cross-section has a u-shape. The opening of the groove 13 opens towards the interior of the section 18 that in cross-section is u-shaped.

As can also be seen from FIGS. 2, 3, the top beam 4 has a reinforcing core section 19. The reinforcing core structure 19 is provided by a part of the beam 4 being generally of a pipe-shape, the pipe extending in the direction of longest extent of the beam 4. The part that makes up the reinforcing core structure 19 of the beam 4 in cross-sections perpendicular to the direction of longest extent of the beam 4 has a closed cross-section in the sense of a ring-shaped cross-section, the ring being a polygonal ring.

As can be seen from FIGS. 2, 3, the top beam 4 has a sealing groove 20. The top beam also has a top groove 21. The top beam 4 also has a slit 22.

As can be seen from FIGS. 2, 3, a connector 23 is provided. The connector 23 is attached to the top beam 4. The connector has a nut 30 and a bolt 31. The bolt 31 is a threaded bolt. By way of the threaded bolt 31, the connector 23 is suitable to connect the top beam 4 to a beam of an endframe of a different gangway (see FIG. 4) or suitable to connect the top beam 4 to a car of a multi-car vehicle or suitable to connect the top beam 4 to a connector attached to a beam of an endframe of a different gangway or suitable to connect the top beam 4 to a connector attached to a car of a multi-car vehicle.

The connector 23 has a base plate 24. As can best be seen from FIG. 2, the base plate 24 at one of its edges has a protrusion 25 that is arranged inside the groove 13. The protrusion 25 of the connector 23 that is arranged inside the groove 13 has an intermediate part 26. The intermediate part 26 extends in parallel to the contact surface 12. The protrusion 25 furthermore has an end part 27. The end part 27 projects at an angle to the intermediate part 26. The end part 27 has an engagement surface that extends in parallel to the backward facing wall 17 and is in contact with the backward facing wall 17.

The groove 13 has an undercut.

As can be seen from FIG. 2, 3, the base plate 24 of the connector 23 is connected to the beam 4 by means of two bolts 28. The bolts 28 are arranged at the opposite end of the base plate 24 compared to the arrangement of the protrusion 25. The end of the base plate 24 that has the bolts 28 has a projection 29 that engages into the top groove 21. At the base of the top groove, holes are provided, through which the bolts 28 reach. A nut 32 is arranged inside the reinforcing core section 19 and the bolt 28 is connected to this nut 32.

The base plate 24 has a first ledge 33 and a second ledge 34. The nut 30 and the bolt 31 are arranged on the first ledge 33. As can be seen from FIGS. 2, 3, the first ledge 33 has a flat surface. The flat surface is arranged in a plane parallel to the plane E, in which the contact surface 12 is arranged. Hence, the flat, forward facing surface of the ledge 33 is not arranged in the same plane as the contact surface 12. However, the second ledge 34 has a forward facing base plate contact surface 35. As can be seen from FIG. 2, the base plate contact surface 35 on the second ledge 34 is arranged in the same plane E as the contact surface 12.

If the connector 23 is not bolted to the top beam 4 by means of the bolts 28, the connector 23 can be slid along the groove 13. This allows for easy placement of the connector 23 at the place, where it is to be placed relative to the top beam 4.

As can be seen from FIG. 3, the lengthwise extent of the connector 23 in the direction of the longest extent of the top beam 4 is substantially smaller than the longest extent of the top beam 4 in this direction.

Figure 8:
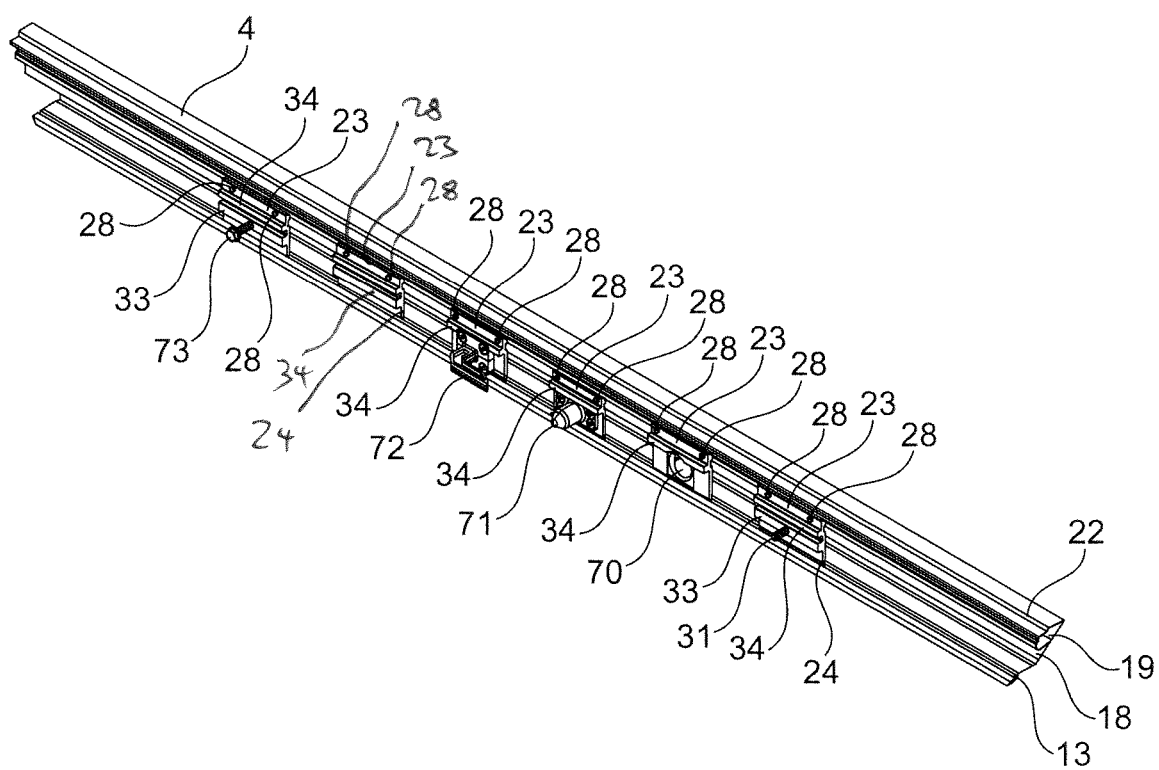
FIG. 8 is a perspective view onto a beam of an endframe with different types of connectors.
Figure 9:
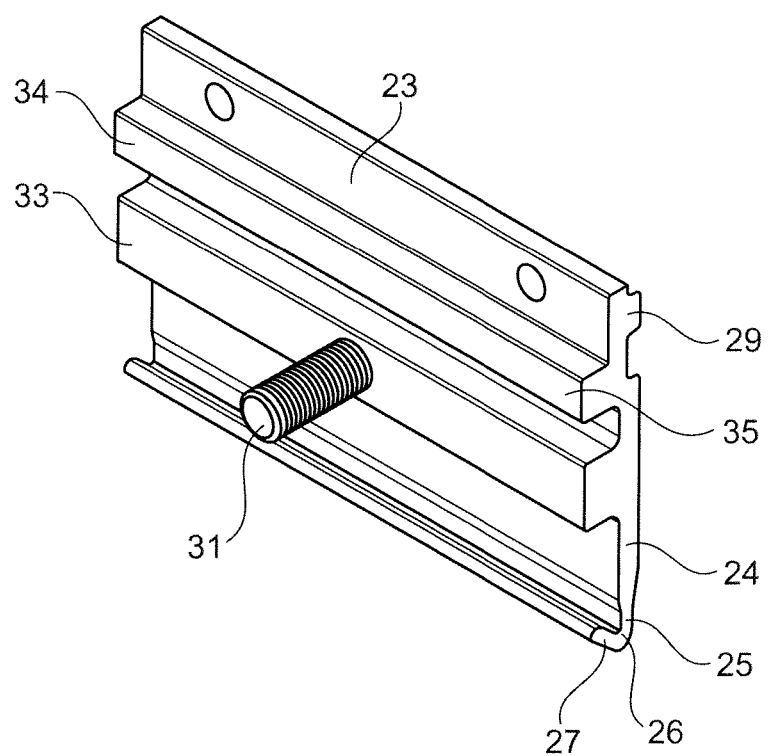
FIG. 9 is a perspective view of a connector of an endframe according to the invention.
Figure 10:
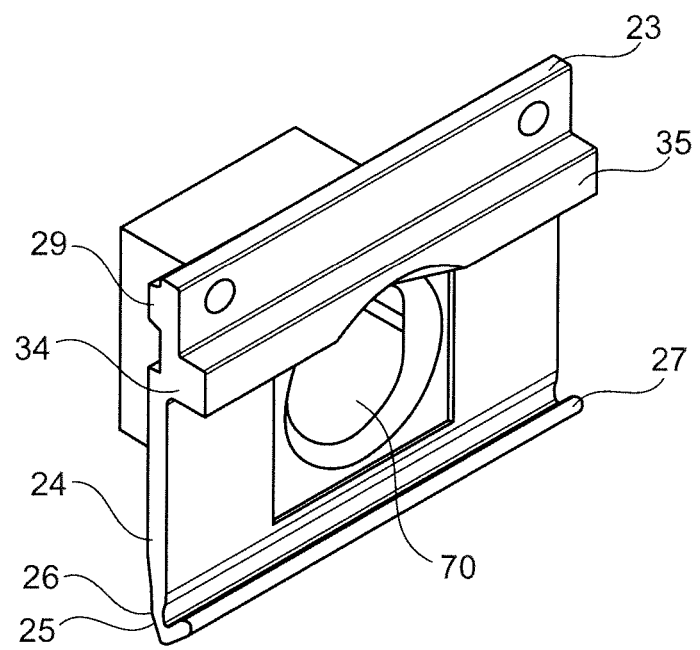
FIG. 10 is a perspective view of a different connector of an endframe according to the invention.
Figure 11:
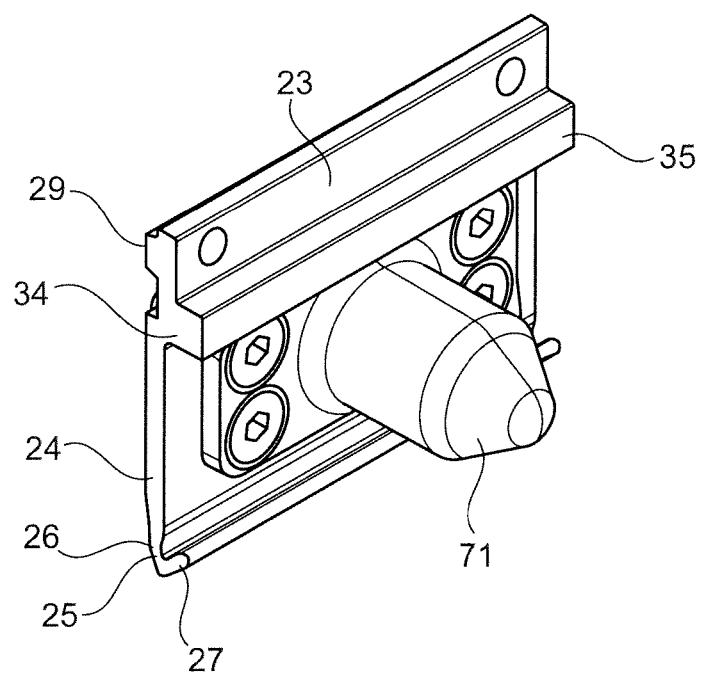
FIG. 11 is a perspective view of a different connector of an endframe according to the invention.
Figure 12:
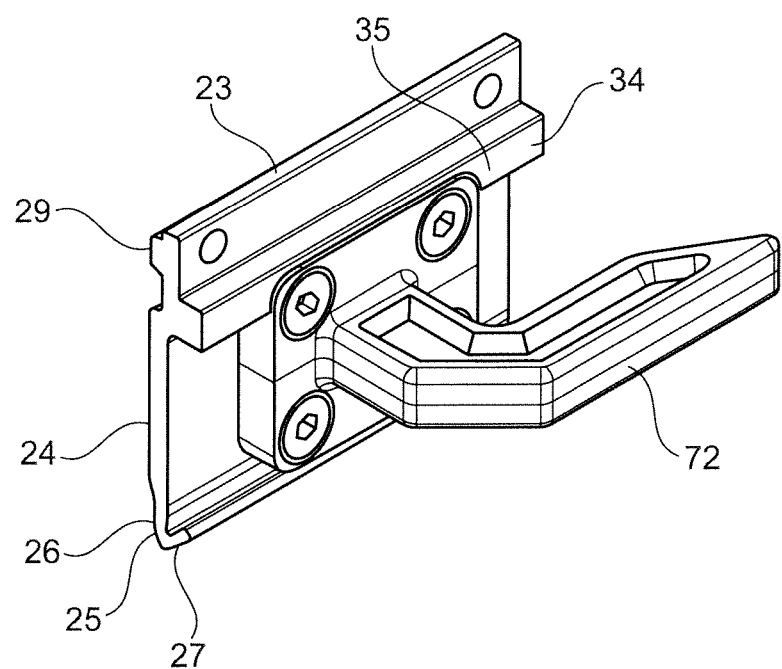
FIG. 12 is a perspective view of a different connector of an endframe according to the invention.
Figure 13:
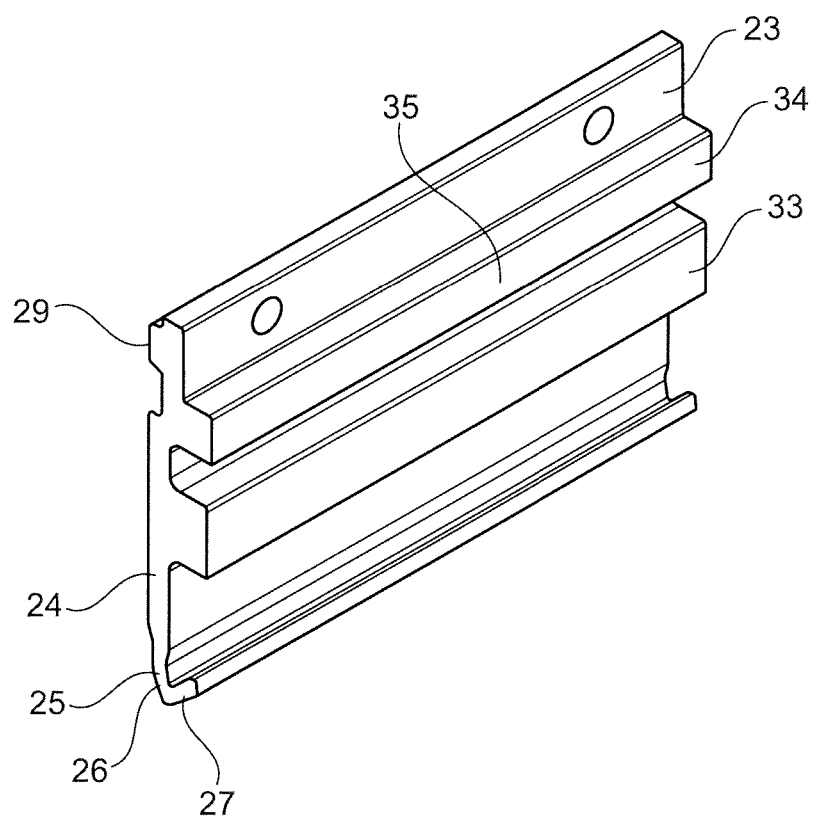
FIG. 13 is a perspective view of a different connector of an endframe according to the invention.
Figure 14:
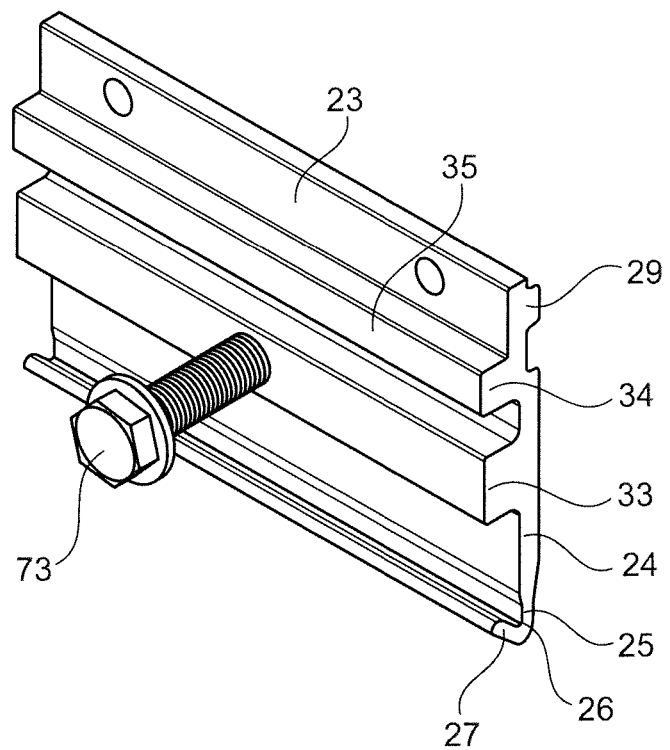
FIG. 14 is a perspective view of a different connector of an endframe according to the invention.

FIG. 8 shows the beam 4 with six different connectors 23 attached to it. The placement of the connectors 23 along the beam 4 is used to show different designs of connectors 23. The connector 23 that is arranged furthest to the left is the connector already described in conjunction with FIG. 3 and has a bolt 31 and a nut (not shown). This connector is also shown in FIG. 9. The connector 23 arranged next to it (also shown in FIG. 10) is a connector that has socket 70. The socket 70 can be used to receive a pin 71 of a connector that is arranged on an endframe to which this endframe is to be connected to. The connector 23 arranged next to it (also shown in FIG. 11) is a connector that has pin 71. The pin 71 can be used to engage into a socket 70 of a connector that is arranged on an endframe to which this endframe is to be connected to. The connector 23 arranged next to it (also shown in FIG. 12) is a connector that has hook 72. The hook 72 can be used to engage into a recess of an endframe to which this endframe is to be connected to. The connector 23 arranged next to it (also shown in FIG. 13) just has a base plat contact surface 35 to make the connection to the neighbouring endframe. The connector 23 arranged next to it (also shown in FIG. 14) a screw 73.

Figure 4:
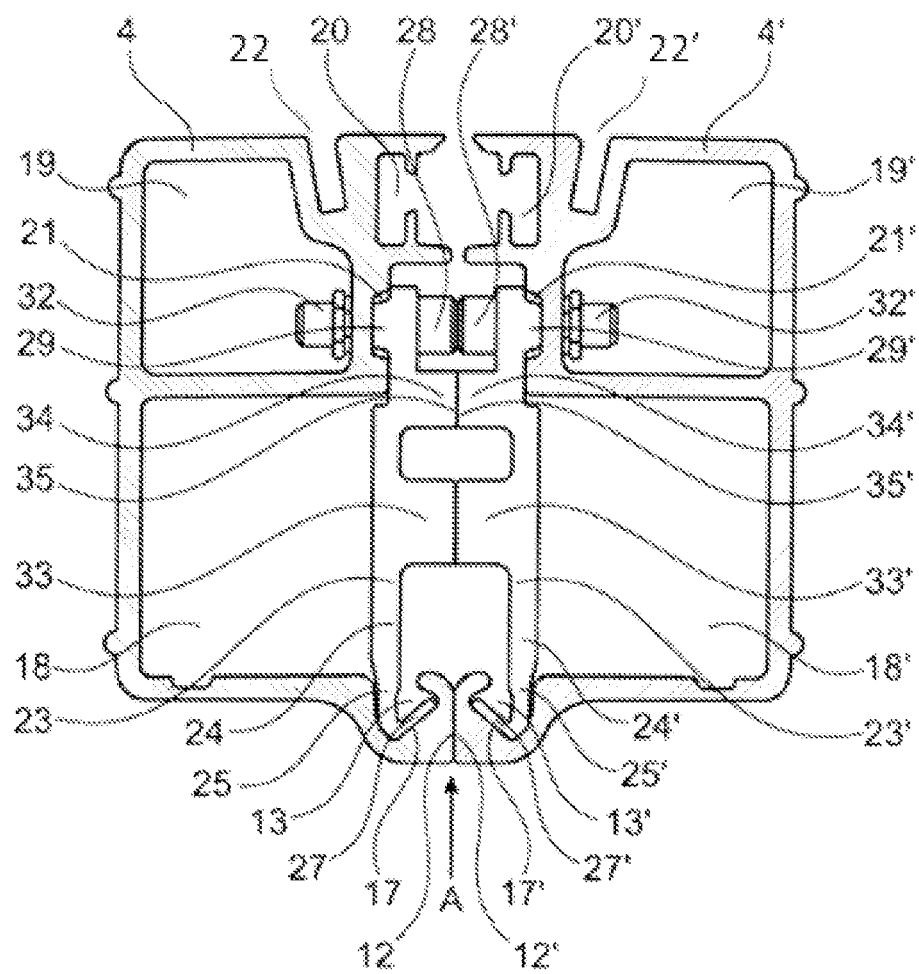
FIG. 4 is a cross-sectional view onto a cross-section of a beam of a first endframe according to the invention being connected to a beam of a second endframe according to the invention without showing further details of the gangway.

FIG. 4 uses the cross-sectional design as shown in FIG. 2 to explain, how a top beam 4 of the endframe 1 can be set against a top beam 4' of the endframe 2. Given that endframe 1 and endframe 2 are designs in a mirrored fashion, the same reference signs are used for the elements of the endframe 2 than have been used for the endframe 1, but to indicate them to belong to the endframe 2 having been provided with a dash or prime ('). Thus, reference numerals 13', 15', 16', 17', 18', 19', 20', 21', 24', 25', 26', 27', 28', 29', 32', 34', 37' identified in FIG. 4 and/or FIG. 5 are mirrored elements of reference numerals 13, 15, 16, 17, 18, 19, 20, 21, 24, 25, 26, 27, 28, 29, 32, 34, and 37, respectively.

Figure 5:
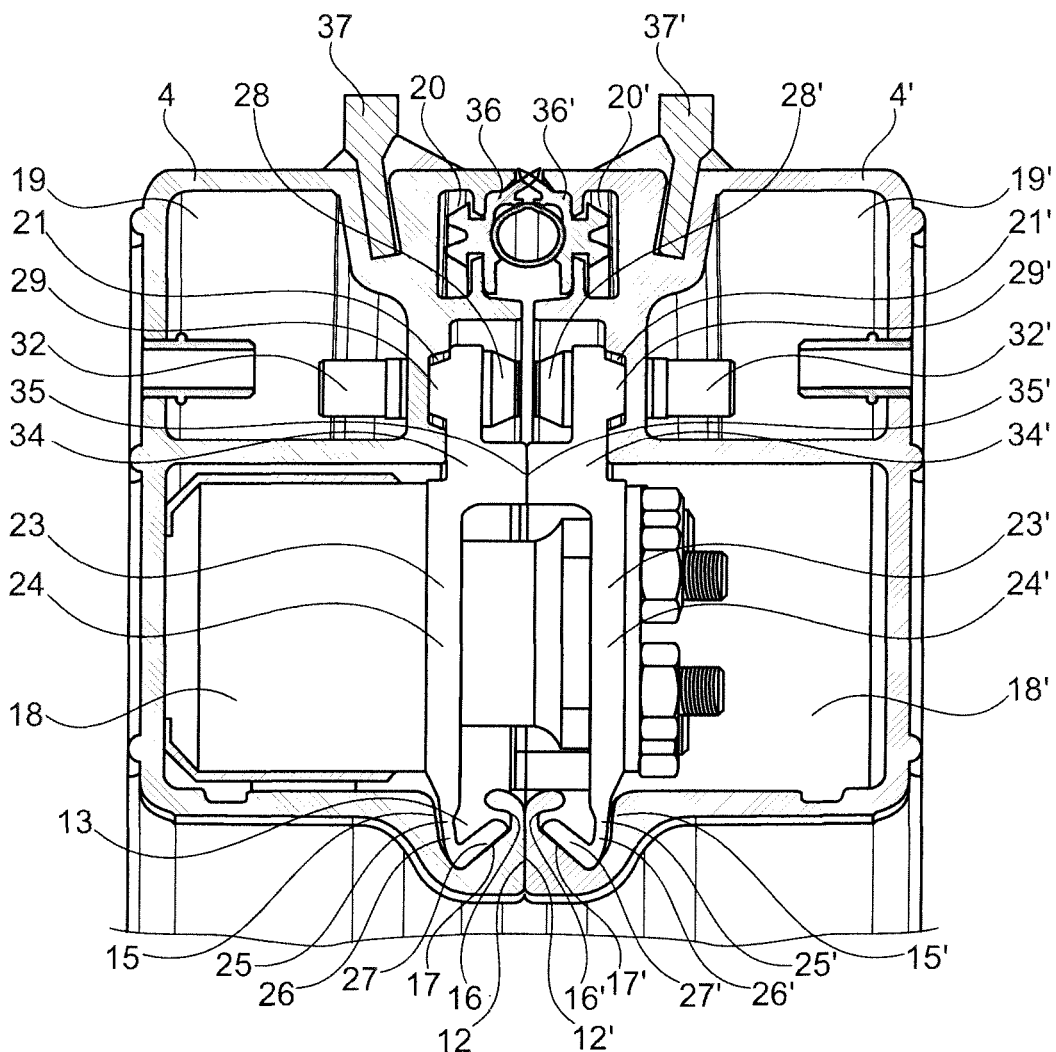
FIG. 5 is a cross-sectional view similar to the view of FIG. 4 with more details of the gangway shown.

To facilitate the view, FIG. 4 does not show the exact means of how the connector 23 is connected to the connector 23' (see FIG. 5).

As can be seen from FIG. 4, the contact surface 12 fully rests against the contact surface 12'. The base plate contact surface 35' rests against the base plate contact surface 35. The forward facing surface of the first ledge 33 is arranged a little distanced from the comparable surface of the first ledge 33'.

As can be seen from FIG. 4, the close contact between the contact surface 12 and the contact surface 12' provides the clean and smooth and closed interface between the endframe 1 and the endframe 2. If viewed upon in the direction of view as indicated by the arrow A in FIG. 4, i.e. from the inside of the passage space 3, the passenger views a fine line, but sees no gaps between the endframe 1 and the endframe 2.

FIG. 5 shows a similar view as FIG. 4, but with further elements having been added. Especially, a seal 36 has been arranged in the sealing groove 20. The seal 36 interengages with the seal 36'.

Furthermore, lifting hooks 37 have been introduced into the slit 22 and the slit 22'. These elements are lifting hooks that can be used to lift the gangway. The lifting hooks 37 can be welded to the top beam 4.

What is claimed is:

1. An endframe of a gangway, the endframe configured to be connected to an endframe of a different gangway or to a car of a multi-car vehicle, the endframe comprising:
    a beam;
    a connector attached to the beam, the connector adapted to connect the beam to a beam of an endframe of a different gangway or to connect the beam to a car of a multi-car vehicle or to connect the beam to a connector attached to a beam of an endframe of a different gangway or to connect the beam to a connector attached to a car of a multi-car vehicle;
    wherein
        a contact surface is formed by a part of the beam; and
        a groove arranged in the beam, wherein the groove has an opening and walls that delimit the groove, wherein one of the walls delimiting the groove is a backward facing wall, the backward facing wall facing away from the contact surface;
    wherein the connector has a protrusion that is arranged inside the groove;
    wherein the connector has a protruding pin, a protruding bolt or a protruding hook and the contact surface is arranged in a plane (E);
    wherein all remaining parts of the connector apart from the protruding pin, the protruding bolt or the protruding hook are arranged on one side of this plane (E);
    wherein the backward facing wall is arranged in another plane (E3); and
    wherein the angle (ALPHA) between the plane (E), in which the contact surface is arranged, and the plane (E3), in which the backward facing wall is arranged, is >0° and <90°.

2. The endframe according to claim 1, wherein the endframe has the shape of a ring that surrounds a passage space.

3. The endframe according to claim 2, wherein the contact surface forms a ring.

4. The endframe according to claim 1, wherein the connector is bolted to the beam.

5. The endframe according to claim 1, wherein the contact surface at least partially overlaps the backward facing wall when viewed in a direction perpendicular to the plane (E), in which the contact surface is arranged.

6. The endframe according to claim 1, wherein the groove extends in parallel to the contact surface.

7. The endframe according to claim 1, wherein the protrusion of the connector that is arranged inside the groove has an intermediate part that extends parallel to the contact surface and has an end part that projects at an angle to the intermediate part.

8. The endframe according to claim 1, wherein the beam is a profiled beam that has a section that in cross-section is c- or u-shaped, and wherein the opening of the groove opens towards an interior of the section that in cross-section is c- or u-shaped.

9. A gangway of a multi-car vehicle having an endframe according to claim 8.

10. The gangway according to claim 9, wherein the gangway has a first part that has a first bellows and an endframe, and a second part that has a second bellows and another endframe, and wherein the endframe of the first part is attached to the another endframe of the second part.

11. A multi-car vehicle having a gangway according to claim 10.

12. The multi-car vehicle according to claim 11, wherein a car of the multi-car vehicle has a frame, and wherein an endframe of the gangway is attached to the frame of the car.

13. A method of connecting a gangway to a frame of a multi-car vehicle, wherein the gangway includes an endframe comprising a beam and a connector attached to the beam, wherein the frame of a car of the multi-car vehicle has a contact surface, and wherein, in connecting the endframe to the frame of the car, the method comprises:
    pressing a contact surface of the endframe against the contact surface of the frame; or
    arranging a seal between the contact surface of the endframe and the contact surface of the frame; said method further comprising:
        arranging a groove in a beam of the endframe, the groove having an opening and walls that delimit the groove, wherein one of the walls delimiting the groove is a backward facing wall, the backward facing wall facing away from a contact surface, the connector having a protrusion that is arranged inside the groove;
    wherein the connector has a protruding pin, a protruding bolt or a protruding hook and the contact surface is arranged in a plane (E);

wherein all remaining parts of the connector apart from the protruding pin, the protruding bolt or the protruding hook are arranged on one side of this plane (E);

wherein the backward facing wall is arranged in another plane (E3); and wherein the angle (ALPHA) between the plane (E), in which the contact surface is arranged, and the plane (E3), in which the backward facing wall is arranged, is >0° and <90°.

14. A method of connecting a first part of a gangway of a multi-car vehicle to a second part of the gangway, wherein the first part of the gangway has a first bellows and an endframe, and a second part of the gangway has a second bellows and another endframe, and wherein the endframe of the first part is connected to the another endframe of the second part by:

pressing a contact surface of the endframe of the first part against a contact surface of the endframe of the second part; or arranging a seal between the contact surface of the endframe of the first part and the contact surface of the endframe of the second part; said method further comprising:

arranging a groove in a beam of the endframe, the groove having an opening and walls that delimit the groove, wherein one of the walls delimiting the groove is a backward facing wall, the backward facing wall facing away from a contact surface, the connector having a protrusion that is arranged inside the groove;

wherein the connector has a protruding pin, a protruding bolt or a protruding hook and the contact surface is arranged in a plane (E);

wherein all remaining parts of the connector apart from the protruding pin, the protruding bolt or the protruding hook are arranged on one side of this plane (E);

wherein the backward facing wall is arranged in another plane (E3); and wherein the angle (ALPHA) between the plane (E), in which the contact surface is arranged, and the plane (E3), in which the backward facing wall is arranged, is >0° and <90°.

* * * * *